(12) United States Patent
Pan

(10) Patent No.: US 10,840,718 B2
(45) Date of Patent: Nov. 17, 2020

(54) CHARGING STAND WITH ADVERTISING LIGHT BOX

(71) Applicant: Guojun Pan, Shanghai (CN)

(72) Inventor: Guojun Pan, Shanghai (CN)

( * ) Notice: Subject to any disclaimer, the term of this patent is extended or adjusted under 35 U.S.C. 154(b) by 146 days.

(21) Appl. No.: 16/211,561

(22) Filed: Dec. 6, 2018

(65) Prior Publication Data

US 2020/0185938 A1 Jun. 11, 2020

(51) Int. Cl.
*H02J 7/00* (2006.01)
*F21S 4/20* (2016.01)
*G09F 13/00* (2006.01)
*H02J 7/02* (2016.01)

(52) U.S. Cl.
CPC ............... *H02J 7/0042* (2013.01); *F21S 4/20* (2016.01); *G09F 13/00* (2013.01); *H02J 7/00* (2013.01); *H02J 7/025* (2013.01)

(58) Field of Classification Search
USPC ....................................................... 320/108
See application file for complete search history.

(56) References Cited

U.S. PATENT DOCUMENTS

| | | | |
|---|---|---|---|
| 10,554,059 B1* | 2/2020 | Hemingway | F21V 23/003 |
| 2014/0097758 A1* | 4/2014 | Recker | H05B 47/19 |
| | | | 315/152 |
| 2016/0219664 A1* | 7/2016 | Ellenberger | H05B 45/10 |
| 2018/0294982 A1* | 10/2018 | Boemi | H04L 12/10 |

* cited by examiner

Primary Examiner — Bryce M Aisaka

(57) ABSTRACT

A charging stand with an advertising light box. The charging stand with an advertising light box includes a light box, and the light box includes a light box sectional material, the light box sectional material includes horizontal bars and vertical bars, each of the inner and outer sides of the horizontal bar is provided with a clamping groove, the vertical bar is provided with a second clamping groove, a constant current source is mounted in the light box, a support panel is mounted above the light box, a USB socket is mounted above the constant current source, the support panel is provided with a USB charging wire, and a mounting-inserting groove is formed in the support panel. By the disposed USB socket, a user can conveniently use a USB charging wire carried by himself/herself for charging.

4 Claims, 6 Drawing Sheets

US 10,840,718 B2

CHARGING STAND WITH ADVERTISING LIGHT BOX

TECHNICAL FIELD

This relates to the technical field of charging stands, and more particularly, to a charging stand with an advertising light box.

BACKGROUND

With social development and progress made by human beings, various advanced devices have been developed, and people's life quality has thus been greatly improved. In order to improve the convenience of people, charging stands are mostly established for parks, shopping malls and roadsides, and accordingly people pay more and more attention to the charging stands.

The current charging stands often only have the charging lines for mainstream mobile phone models. However, when users use the mobile phones or digital devices of a special model, the charging service cannot be provided. When there is a need to charge at night, great inconvenience is caused since there is no illumination.

SUMMARY

An objective is to provide a charging stand with an advertising light box, to solve the above problems mentioned in the background part that the current charging stands are single in function and cannot provide the charging service for the mobile phones and digital devices of more models, and the use is inconvenient since there is no illumination in use at night.

In order to achieve the above objective, there is provided the following technical solution. A charging stand with an advertising light box comprises a light box. The light box consists of a light box sectional material. The light box sectional material includes horizontal bars and vertical bars. Each of the inner and outer sides of the horizontal bar is provided with a clamping groove. The vertical bar is provided with a second clamping groove. A constant current source is mounted in the light box. A support panel is mounted above the light box. A USB socket is mounted above the constant current source. The support panel is provided with a USB charging wire. A mounting-inserting groove is formed in the support panel. A wireless charging base is embedded in the mounting-inserting groove. A support bar is mounted above the support panel. an inserting groove is formed in the support bar. A second light box is mounted above the support bar. The USB charging wire is electrically connected to the USB socket. The constant current source is electrically connected to the USB socket and an external power source.

Preferably, four vertical bars are disposed, eight horizontal bars are disposed, and an inner corner and an outer corner are disposed between two adjacent horizontal bars.

Preferably, the light box and the second light box have the same structure, and each of the light box and the second light box is provided with a modular light strip therein, and the modular light strips are electrically connected to the external power source.

Preferably, the USB charging wire is fixed to the support bar by the disposed inserting groove.

Compared with the prior art, the utility model has the beneficial effects: according to the charging stand with an advertising light box, the user can conveniently use the USB charging wire carried by himself/herself for charging through the disposed USB socket, and the applicable range of the present utility model is wider. The user can mount an LED lamp in the light box according to actual needs in the use process. Illumination is provided for charging users at night. Besides, the user can also mount the advertising cloth by the clamping grooves and the second clamping grooves disposed in the vertical bars and the horizontal bars. When the user charges, products can be promoted by the disposed advertising cloth to enhance the popularity of the product, and the practicability is of the present utility model higher. Since the light box consists of the light box sectional material, the light box can be disassembled into parts when the charging stand needs to be replaced by a new one after long term use. The maintenance and recycling of the present utility model are greatly facilitated, and higher practicability thereof is realized.

In the figures, the reference numbers represent the following members respectively: 1—light box, 2—light box sectional material, 3—horizontal bar, 4—vertical bar, 5—clamping groove, 6—second clamping groove, 7—constant current source, 8—support panel, 9—USB socket, 10—USB charging wire, 11—mounting-inserting groove, 12—wireless charging base, 13—support bar, 14—inserting groove, 15—second light box, 16—inner corner, 17—outer corner, 18—modular light strip.

DETAILED DESCRIPTION

The technical solutions in the embodiments of the utility model will be clearly and completely described in conjunction with the accompanying drawings in the embodiments of the utility model. It is obvious that the described embodiments are only part and not all of the embodiments of the utility model. All other embodiments obtained by those ordinary skilled in the art based on the embodiments of the utility model without creative efforts are within the scope of the utility model.

Figure 1:
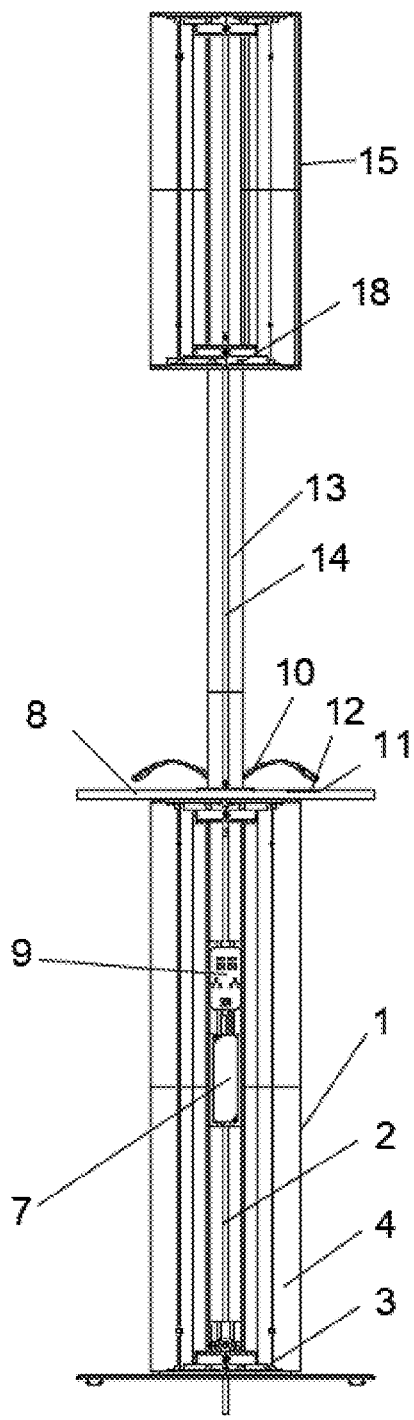
FIG. 1 is a structural schematic diagram of the utility model.
Figure 2:
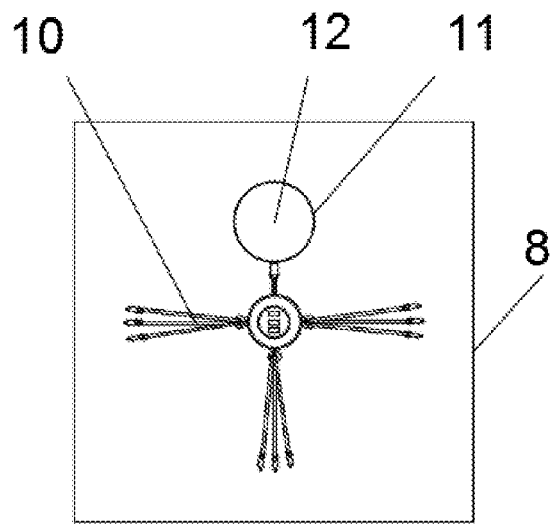
FIG. 2 is a top structural schematic diagram of a light box of the utility model.
Figure 3:
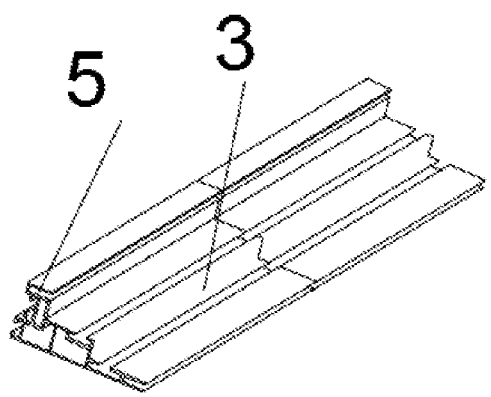
FIG. 3 is a structural schematic diagram of a horizontal bar of the utility model.
Figure 4:
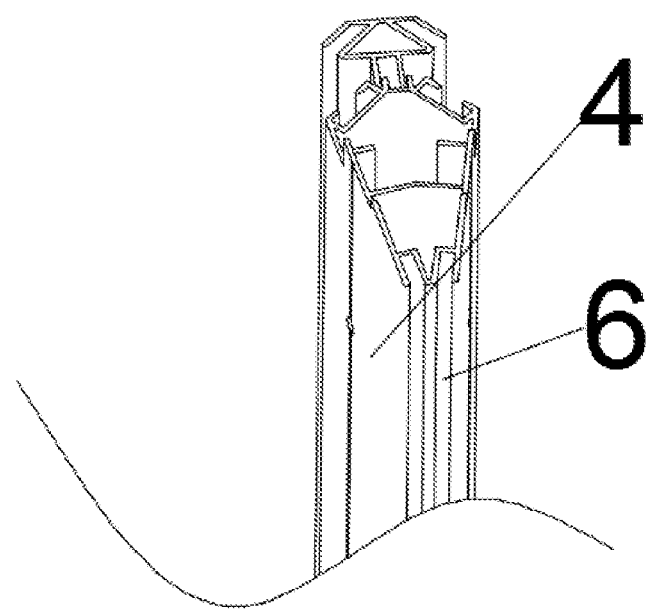
FIG. 4 is a structural schematic diagram of a vertical bar of the utility model.
Figure 5:
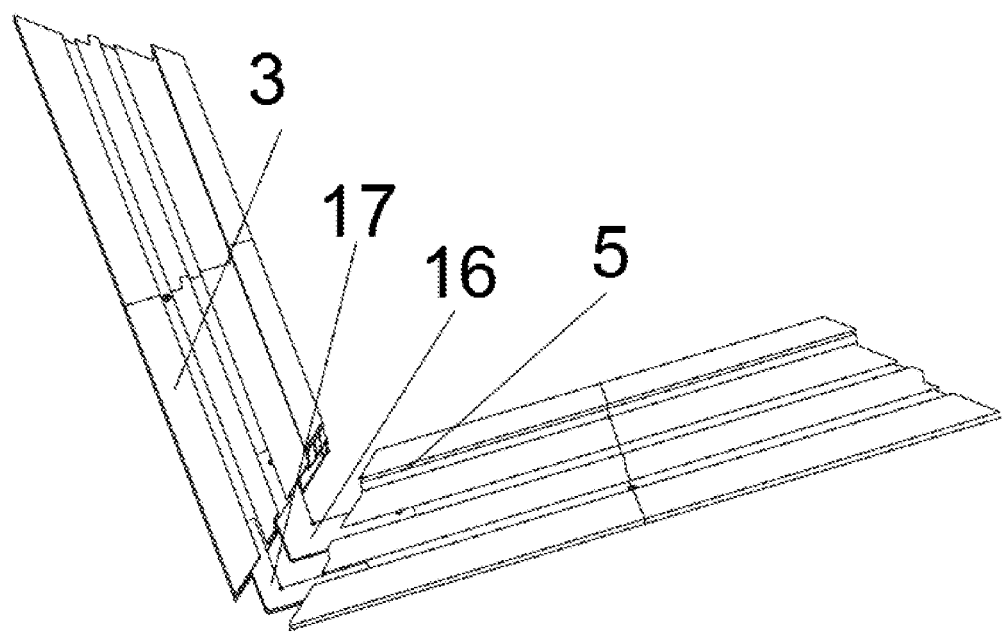
FIG. 5 is a connecting structural schematic diagram of the horizontal bar of the utility model.
Figure 6:
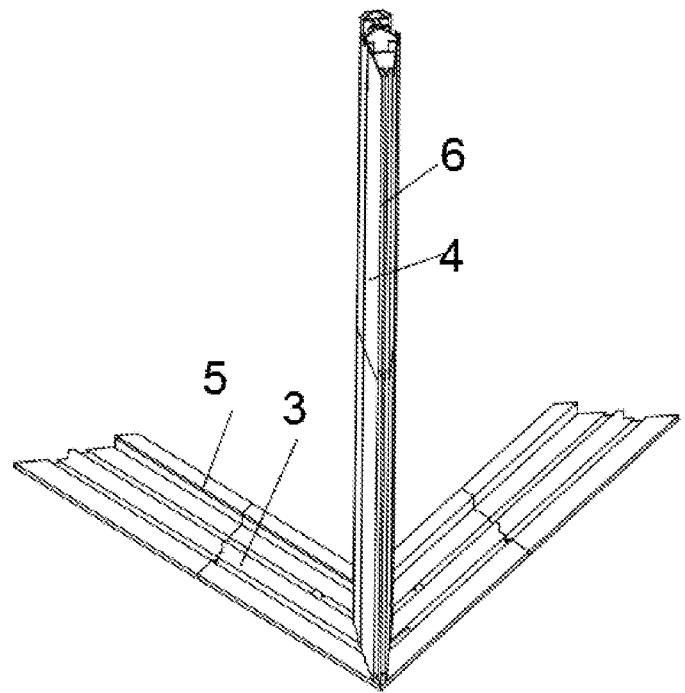
FIG. 6 is a mounting structural schematic diagram of the horizontal bar and the vertical bar of the utility model.
Figure 7:
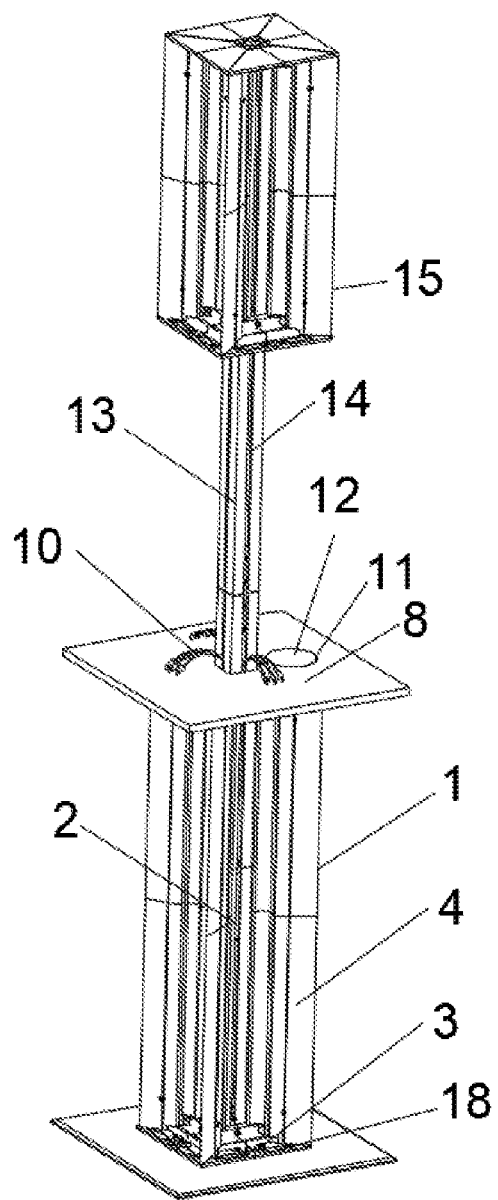
FIG. 7 is an effect showing diagram of the utility model.
Figure 8:
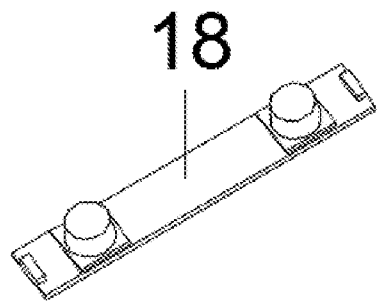
FIG. 8 is an entity effect showing diagram of a modular light strip of the utility model.
Figure 9:
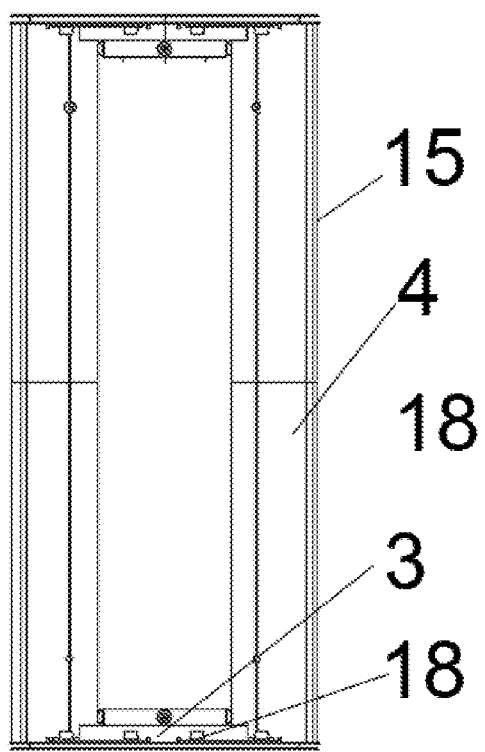
FIG. 9 is a mounting structural schematic diagram of the modular light strip of the utility model.

Referring to FIGS. 1-9, the utility model provides a technical solution as below. A charging stand with an advertising light box includes a light box 1 consisting of a light box sectional material 2. The light box sectional material 2 comprises horizontal bars 3 and vertical bars 4. Each of the inner and outer sides of the horizontal bar 3 is provided with a clamping groove 5. The vertical bar 4 is provided with a second clamping groove 6. A constant current source 7 is mounted in the light box 1. Besides, a support panel 8 is mounted above the light box 1. A USB socket 9 is mounted above the constant current source 7. The support panel 8 is provided with a USB charging wire 10. The support panel 8 is provided with a mounting-inserting groove 11. A wireless charging base 12 is embedded in the mounting-inserting groove 11. A support bar 13 is mounted above the support panel 8. An inserting groove 14 is formed in the support bar 13, and a second light box 15 is mounted above the support bar 13. The USB charging wire 10 is electrically connected to the USB socket 9. The constant current source 7 is electrically connected to the USB socket 9 and an external power source.

In the present embodiment, in order to facilitate the user to assemble the light box 1, preferably, four vertical bars 4 are disposed, eight horizontal bars 3 are disposed, and an inner corner 16 and an outer corner 17 are disposed between two adjacent horizontal bars 3. The inner corners 16 and the outer corners 17 play a supporting and fixing role for the connection of the horizontal bars, and can prevent the light box 1 from falling apart due to an external force in use. Higher practicability of the present utility model is realized.

In the present embodiment, preferably, the light box 1 and the second light box 15 have the same structure. A modular light strip 18 is mounted in each of the light box 1 and the second light box 15. The modular light strips 18 are electrically connected to the external power source. The modular light strips 18 are side-lit. The intervals of light beads on the modular light strips 18 are equal. During illumination, the illumination brightness is more uniform. The user may select one light box 1 for placing an advertising cloth, and select the other light box for illumination. Or both light boxes may be used as the light boxes 1 for placing the advertising cloth. Higher practicability of the present utility model is realized.

In the present embodiment, in order to facilitate the user to find the corresponding USB charging wire 10, preferably, the USB charging wire is fixed on the support bar 13 by the disposed inserting groove 14. The USB charging wire 10 can be classified by a binding belt according to the type, and placed in the inserting groove 14, thereby greatly facilitating the user to find the USB charging wire 10 to be used. By the disposed USB socket 9, the user may also use the USB charging wire 10 carried by himself/herself for charging. The practicability of the present utility model is higher.

In addition, preferably, the output power of the constant current source 7 is 35 W. The constant current source 7 is mainly used for detecting a thermal relay, a molded case circuit breaker, a small short circuit device, as well as for the production occasions where a rated current, an operating current, a short circuit protection current, and the like need to be set. The constant current source 7 is a current source of which the output current is kept constant. In the use process, the user can provide a stable current for the USB charging wire 10, the USB charging socket 9 and the LED lamp mounted according to the requirements, and higher practicability of the present utility model is realized.

In addition, preferably, the USB charging socket 9 and the USB charging wire 10 are of an integrated structure, thereby preventing a charger from taking the USB charging wire 10 away. Besides, the USB charging socket 9 is also provided with an extra charging interface, which is convenient for the user to carry a charging wire by himself/herself for charging. Higher practicability of the present utility model is realized.

Working principle: firstly, the user needs to mount the charging stand with an advertising light box according to a drawing, and then the power source can be turned on for standby. During mounting, the light box 1 is assembled at first. During assembling, firstly, the horizontal bars 3 are fixed together by using the inner corners 16 and the outer corners 17. Afterwards, the vertical bars 4 can be mounted on the horizontal bars 3 in a form of screw fixing, and then the assembling of the light box 1 can be completed according to the above method. When the assembling work of the light box 1 is completed, the support bar 13 and the second light box 15 can be further mounted. After the mounting is completed, the USB socket 9 and the USB charging wire 10 can be mounted, and then can be placed at a designated place for use by the user. When the present utility model is in use, the user may mount the LED lamp and the advertising cloth on the light box 1. When the advertising cloth is mounted, the advertising cloth is mounted by the clamping grooves 5 and the second clamping grooves 6 formed in the vertical bars 4 and the horizontal bars 3. When replacement is required, the old advertising cloth can be quickly disassembled. The mounting and disassembling are more convenient and the practicability of the present utility model is higher.

Although the embodiments of the utility model have been illustrated and described, it will be understood by those ordinary skilled in the art that various changes, modifications, substitutions and transformations could be performed on these embodiments without departing from the principle and spirit of the utility model. The scope of the utility model is defined by the appended claims and their equivalents.

What is claimed is:

1. A charging stand with an advertising light box, comprising; a light box, wherein the light box comprises a light box sectional material, the light box sectional material comprises horizontal bars and vertical bars, each of the inner and outer sides of the horizontal bar is provided with a clamping groove, the vertical bar is provided with a second clamping groove, a constant current source is mounted in the light box, a support panel is mounted above the light box, a Universal Serial Bus (USB) socket is mounted above the constant current source, the support panel is provided with a Universal Serial Bus (USB) charging wire, a mounting-inserting groove is formed in the support panel, a wireless charging base is embedded in the mounting-inserting groove, a support bar is mounted above the support panel, an inserting groove is formed in the support bar, a second light box is mounted above the support bar, the USB charging wire is electrically connected to the USB socket, and the constant current source is electrically connected to the USB socket and an external power source.

2. The charging stand with an advertising light box according to claim 1, wherein four vertical bars are disposed, eight horizontal bars are disposed, and an inner corner and an outer corner are disposed between two adjacent horizontal bars.

3. The charging stand with an advertising light box according to claim 1, wherein the light box and the second light box have the same structure, each of the light box and the second light box is provided with a modular light strip therein, and the modular light strips are electrically connected to the external power source.

4. The charging stand with an advertising light box according to claim 1, wherein the USB charging wire is fixed to the support bar by the disposed inserting groove.

* * * * *